US006444097B1

(12) United States Patent
Li et al.

(10) Patent No.: US 6,444,097 B1
(45) Date of Patent: Sep. 3, 2002

(54) RADIOACTIVE DECONTAMINATION

(75) Inventors: Lin Li; William M Steen, both of Liverpool; Peter J Modern, Preston, all of (GB)

(73) Assignee: British Nuclear Fuels plc, Cheshire (GB)

( * ) Notice: Subject to any disclaimer, the term of this patent is extended or adjusted under 35 U.S.C. 154(b) by 0 days.

(21) Appl. No.: 08/481,367

(22) PCT Filed: Nov. 8, 1994

(86) PCT No.: PCT/GB94/02452

§ 371 (c)(1), (2), (4) Date: Sep. 5, 1995

(87) PCT Pub. No.: WO95/13618

PCT Pub. Date: May 18, 1995

(30) Foreign Application Priority Data

Nov. 9, 1993 (GB) .............................................. 9323052

(51) Int. Cl.[7] .............................................. C07B 63/00

(52) U.S. Cl. ............................ 204/157.41; 204/157.15; 204/158.2; 588/227; 134/1; 250/492.1

(58) Field of Search ......................... 204/157.15, 158.2, 204/157.41; 250/492.1; 134/1; 588/227

(56) References Cited

U.S. PATENT DOCUMENTS 4,898,650 A * 2/1990 Wu et al. ..................... 204/29
5,151,134 A * 9/1992 Boquillon et al. ............. 134/1
5,151,135 A * 9/1992 Magee et al. .................. 134/1

FOREIGN PATENT DOCUMENTS

EP 0091646 * 10/1983
EP 0 091 646 10/1983
JP 4-109200 10/1992
JP 4109200 * 10/1992

* cited by examiner

*Primary Examiner*—Dwayne C. Jones
*Assistant Examiner*—C. Delacroix-Muirheid
(74) *Attorney, Agent, or Firm*—Nixon & Vanderhye P.C.

(57) ABSTRACT

A method for the removal of embedded contamination from a metallic surface in which a laser beam is directed on to the contaminated surface. The laser beam has sufficient power density to cause direct ejection of laser-generated melt pool liquid from the metallic surface thereby removing a metallic surface layer containing the embedded contamination. Means are provided for the collection of laser ejected material in order to prevent recontamination of the metallic surface or contamination of previously uncontaminated surfaces.

10 Claims, 4 Drawing Sheets

RADIOACTIVE DECONTAMINATION

This application is a 371 of PCT/G02452 filed Nov. 8, 1994.

BACKGROUND OF THE INVENTION

1. Field of the Invention

This invention relates to the removal of radioactive contamination and, more particularly, to the removal of embedded radioactive contamination from metallic surfaces using laser beams.

2. Discussion of Prior Art

During the operation of nuclear processing plants it is inevitable that surfaces will become contaminated with radioactive substances. Consequently, during the decommissioning of these plants it is necessary to decontaminate the contaminated surfaces in a safe manner. Often the contaminated surfaces comprise stainless steels or mild steels and typical contaminants include $UO_2$, $PuO_2$, Co-60, Sr-90, Cs-134 and Cs-137. The contaminants may be in the form of fine particles or solutions which can penetrate into steel substrates for a distance of about 4 mm. In such situations well known decontamination techniques such as chemical washing, fluid shear blowing or paste/stripping are not effective for the removal of embedded contamination.

One current approach for the reduction of contamination is to maintain a negative pressure within a nuclear containment such that radioactive contamination is confined within specific zones. However, such a scheme has a disadvantage in that running costs are high.

EP0091646 describes a technique for laser (ns pulse) ablation/vaporisation of thin (less than 40 microns) metal oxide films from metal surfaces. The ablation technique is achieved by applying a high energy laser pulse (exceeding 1 GW) to directly break molecular bonds without going through thermal stages. The typical depth of the removed layer is of the order of microns. The laser vaporisation removal is not efficient for metallic surfaces since much heat can be lost through conduction. Again the depth of the removed layer is in the micron range.

Another known technique, described in JP 63024139, uses oft axis gas injection into the laser melt pool for the removal of laser-generated molten materials. This technique can achieve the removal of surface layers of the order of millimetres. However, the alignment of the gas jet relative to the melt pool is critical and when there are object standoff changes the correct alignment is often difficult to achieve. Another disadvantage is that this technique is suited to processing in one direction only.

SUMMARY OF THE INVENTION

According to the present invention there is provided a method for the removal of embedded contamination from a metallic surface, the method comprising directing a laser beam on to the contaminated surface, the laser beam having sufficient power density to cause direct ejection of laser-generated melt pool liquid from the metallic surface thereby removing a metallic surface layer containing the embedded contamination.

Preferably, the power density is greater than 6 $MW/cm^2$.

Preferably, the laser beam comprises pulsed energy, eg having a pulse length of at least 1 ms and a pulse energy of 5 J.

The method makes use of laser-generated vapour pressure and optical pressure to achieve the direct ejection of laser molten liquid, and the laser generated vapour recoil pressure is typically between 5 to 100 bar. The molten liquid can be ejected at least 0.1 metre and as far as 2.5 metres from the melt pool.

Conveniently, the metallic surface may comprise stainless steel or mild steel.

Advantageously, the ejection of the laser-generated melt pool liquid is achieved without the use of an additional gas jet blown into the melt pool.

The method can remove a contaminated surface layer to a depth of up to 5 mm.

Desirably, means may be provided for the collection of laser ejected material in order to prevent recontamination of the metallic surface or contamination of previously uncontaminated surfaces and the collection means may comprise an air/water spray and an extraction system.

The laser producing the laser beam may be a gas or a solid state type laser.

The inventors have recognised that since the majority (more than 90%) of embedded contamination is within 1 mm of the surface of contaminated steel, the removal of this surface layer allows the level of contamination to be greatly reduced. The present invention is, therefore particularly advantageous in the safe removal and collection of such embedded contamination.

The present invention is particularly suited to the removal of contamination along a linear path such as that defined by joints, cracks, edges, corners, gaps or the like from which the contamination cannot be washed out or removed by conventional means during the decontamination of metallic nuclear installations.

The present invention may also be used for the removal of contamination from the interior surfaces of metallic pipes or tubes.

The meltpool as produced by the method according to the present invention is strongly radiation-emitting and we have found that the radiation emitted can be detected, digitised and analysed in the method described in a copending International Patent Application of even date by the present applicants claiming priority from GB 9323054.8 the contents of which are incorporated herein by reference. The image produced thereby gives information about the surface orientation, local geometry and standoff distance relative to the heat or laser source producing the meltpool.

BRIEF DESCRIPTION OF THE DRAWINGS

Embodiments of the present invention will now be described, by way of example only, with reference to the accompanying drawings, in which.

DETAILED DISCUSSION OF PREFERRED EMBODIMENTS

Figure 1:
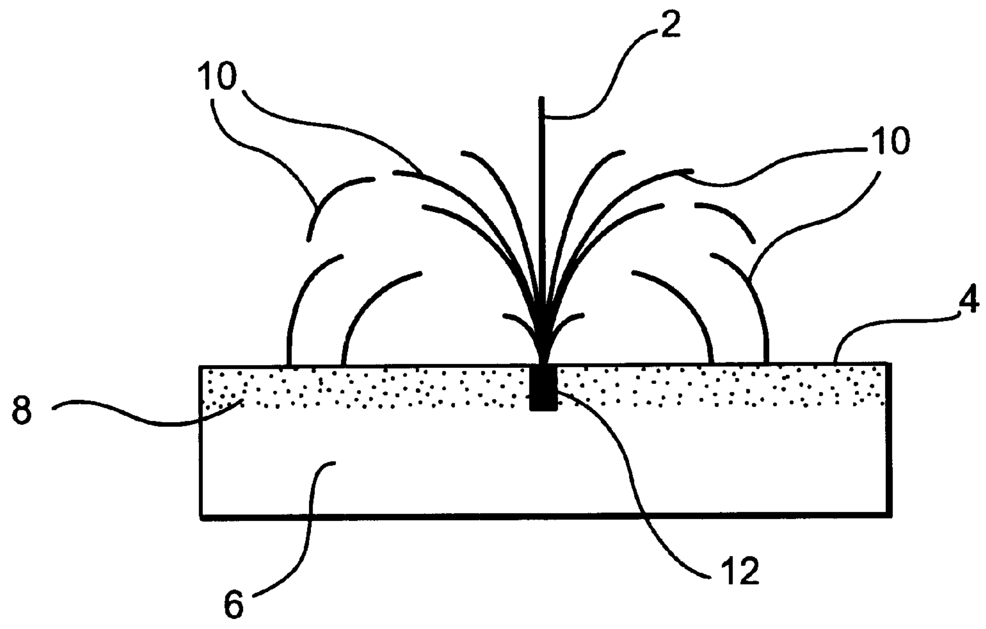
FIG. 1 is a side elevation showing laser-generated liquid ejection of-materials from a stationary workpiece.

Referring now to FIG. 1, a laser beam 2 is shown impinging upon a surface 4 of a stationary metallic workpiece 6, the surface 4 having a layer of embedded radioactive contamination 8. The laser beam 2 has a power density of greater than 6 $MW/cm^2$ and is operated at a pulse length of several milliseconds. At the point where the laser beam 2 meets the surface 4 a laser melt pool 12 is formed. Molten material 10, containing the radioactive contamination 8 is ejected from the melt pool 12 due to a laser-generated vapour recoil pressure of between 5 to 100 bar and to a lesser extent to a laser photo pressure (which is the power density divided by the speed of light). The ejected material may be thrown for distances of up to 2.5 metres from the melt pool 12.

Figure 2:
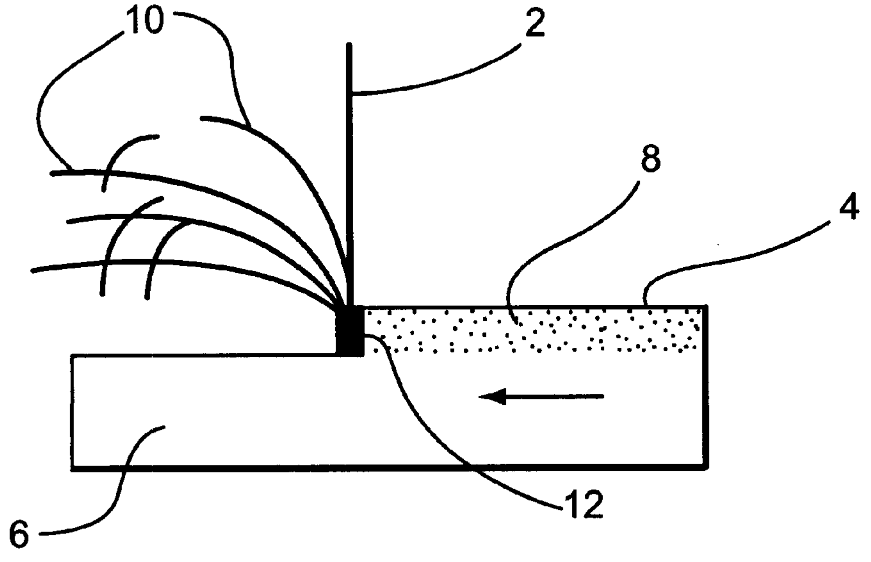
FIG. 2 is a side elevation showing laser-generated liquid ejection of materials from a moving workpiece.

In FIG. 2 the laser beam 2 is shown impinging upon the surface 4 of the workpiece 6 with the workpiece 6 now moving in the direction indicated by the arrow. As described in relation to FIG. 1, molten material 10 containing the radioactive contamination 8 is ejected from the laser melt pool 12 for distances of up to 2.5 metres. When the workpiece 6 is travelling in the direction indicated by the arrow the molten material 10 also tends to be ejected in that direction. In situations where the laser beam 2 is moving and the workpiece 6 is stationary, the molten material 10 is ejected in the direction opposite to the direction of travel of the laser beam 2.

Figure 3:
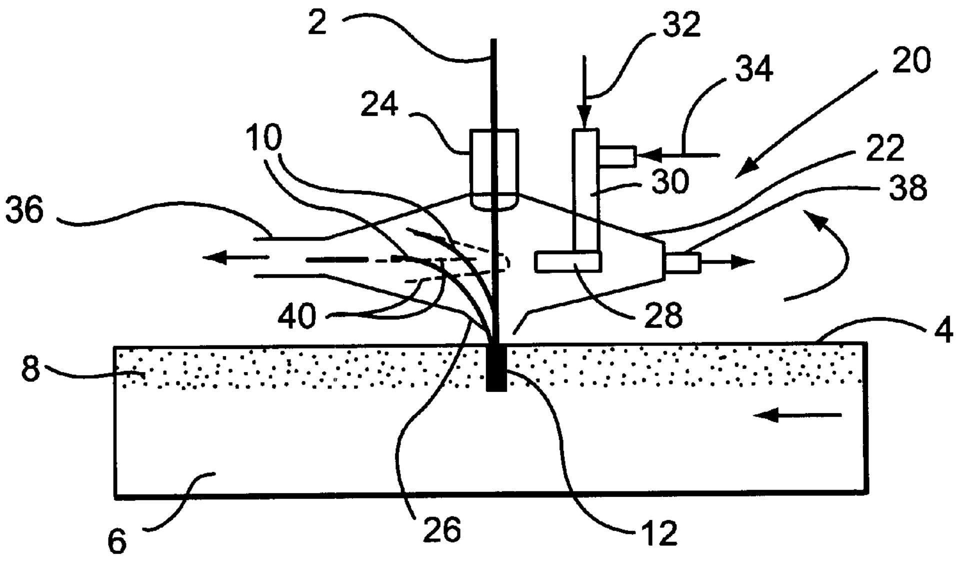
FIG. 3 is a side elevation showing laser-generated liquid ejection of materials and a collection means.

Referring now to FIG. 3, the laser beam 2 is shown impinging upon the surface 4 of the moving workpiece 6 such that molten material 10 is ejected as described in relation to FIG. 2. Prior to impinging upon the surface 4 the laser beam 2 passes through a collection means 20 located in close proximity to the surface 4. The collector 20 comprises a housing 22 having a laser inlet 24 and a laser outlet 26 aligned such that the laser beam 2 passes through the housing 22 in an uninterrupted manner to impinge upon the surface 4. The housing 22 has two opposed extraction outlets 36, 33 located on an axis of symmetry of the housing 22, the axis of symmetry being approximately perpendicular to the laser beam 2. A nozzle 28 is located in the housing 22 and is positioned so as to point in a direction approximately perpendicular to the laser beam 2. The nozzle 28 is connected via a tube 30 to a compressed air inlet 32 and to a water inlet 34. The collector 20 is rotatable by means of a motorised rotational system (not shown).

In operation, the collector 20 moves synchronously with the movement of the laser beam 2 and the molten ejected material 10 is sprayed with an air/water mist 40 from the nozzle 28. The molten material 10 is thereby cooled to form metallic particles which contain the radioactive contamination 8. These particles and water are removed from the housing 22 via the extraction outlets 36, 38 by suitable extraction means (not shown) acting on the outlets 36, 38. The collector 20 may be rotated by the motorised rotational system (not shown) so as to allow laser processing to occur in all directions.

The use of the water/air mist has been found to be very effective in cooling the molten ejected material and thereby facilitates the collection of the metal particles (which typically may have diameters of up to 3 millimetres). For stainless steel and mild steel workpieces, the typical depth from which material is ejected is around 0.5 to 1.5 millimetres per pulse (of 1 to 10 milliseconds duration) using a Yttrium Aluminium Garnet (YAG) laser. The rate of ejection of material from the surface is between 50 to 100 $cm^2/kWhr$.

Figure 4:
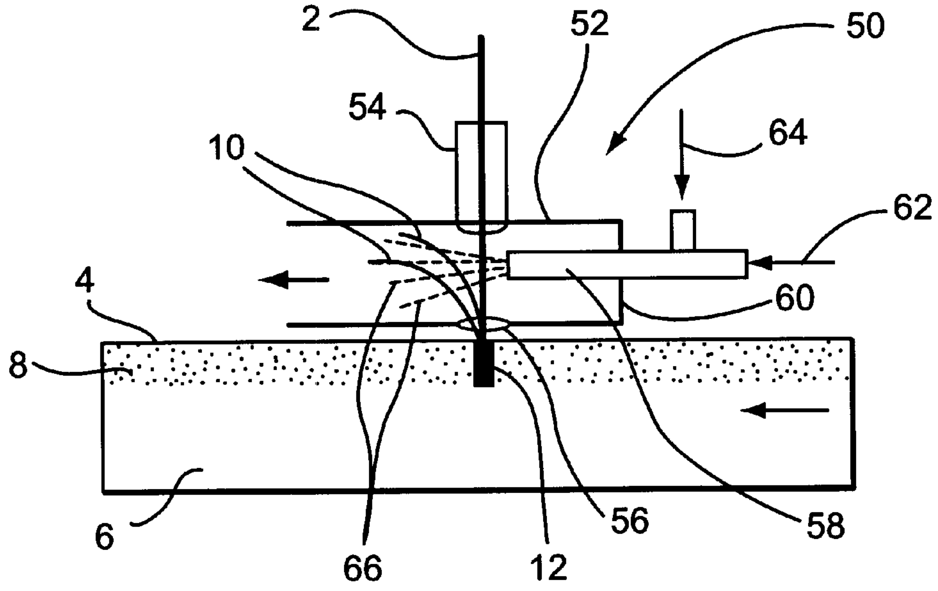
FIG. 4 is a side elevation showing laser-generated liquid ejection of materials and an alternative collection means.

In FIG. 4 an alternative collection means 50 is shown comprising a hollow cylindrical housing 52, open at one end and with its axis of symmetry perpendicular to the direction of the laser beam 2 and in close proximity to the surface 4. The housing 52 has a laser inlet 54 and a laser outlet 56 arranged such that the laser beam 2 passes in an uninterrupted manner through the housing 52 to impinge upon the surface 4. A nozzle 58 projects into the housing 52 by way of the closed end 60 thereof and points along the axis of symmetry of the housing 52 so as to discharge through the laser beam 2. The nozzle 58 is connected via a tube to a compressed air inlet 62 and a water inlet 64.

In operation of the collector 50, the molten ejected material 10 is sprayed with an air/water mist 66 from the nozzle 58. The molten material is thereby cooled to form metallic particles which contain the radioactive contamination 8. The particles and water are removed from the housing 52 by suitable extraction means (not shown) acting on the open end of the housing 52.

The use of the collectors described above allows contaminated material, removed by direct ejection of laser molten material from the surface, to be collected and removed so that the decontaminated surface is not recontaminated by molten contaminated material depositing on the decontaminated surface.

Figure 5:
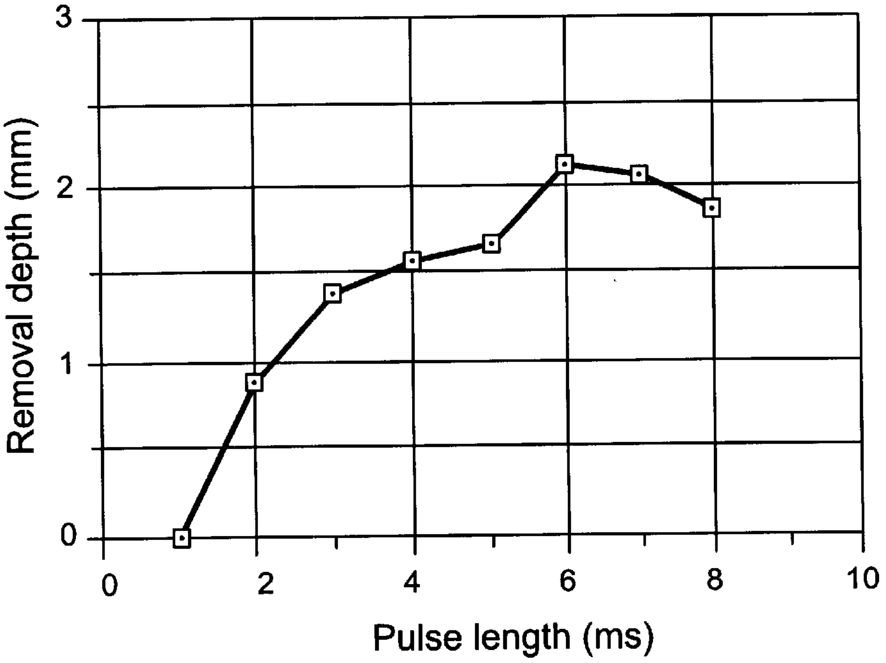
FIG. 5 is a graph of metal removal depth versus laser pulse length.
Figure 6:
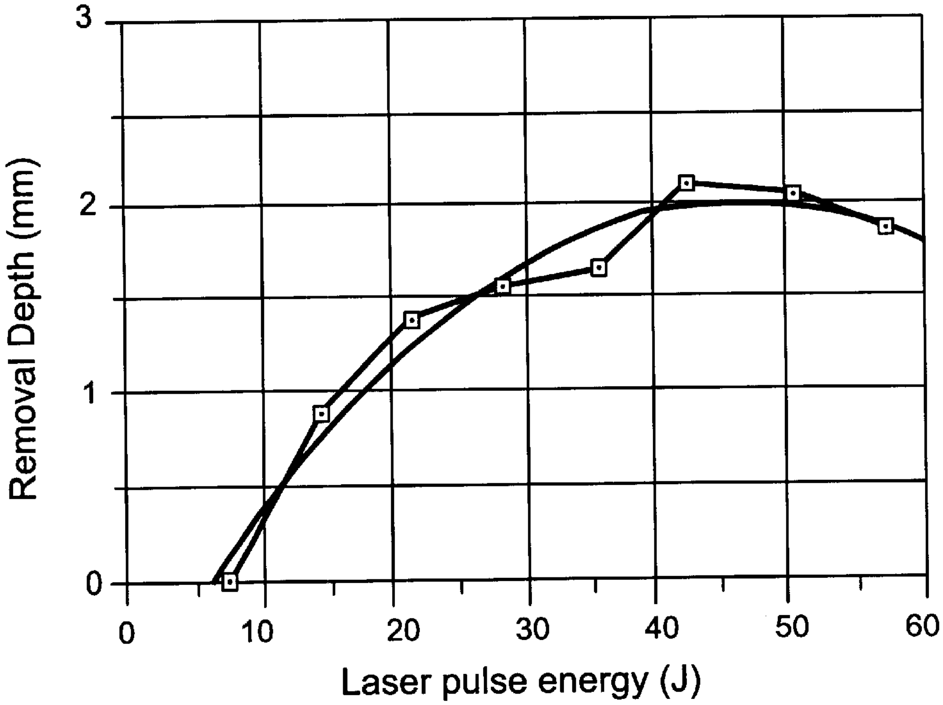
FIG. 6 is a graph of metal removal depth versus laser pulse energy.
Figure 7:
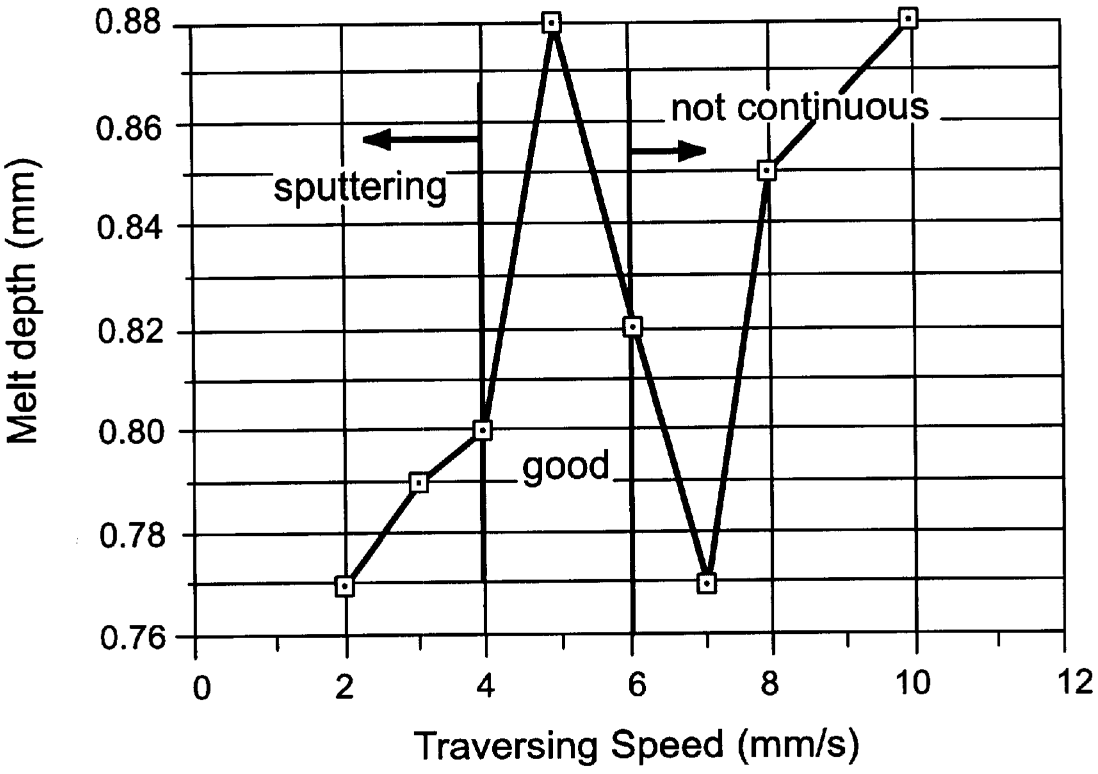
FIG. 7 is a graph of melt depth versus laser traversing speed.

FIGS. 5 to 7 show the relationships between a number of operating parameters and material removal depth for the method described above, when using a YAG laser operating at between 10 to 55 Joules, with a 1 to 8 millisecond pulse time, having a repetition rate of between 3 to 30 Hertz and a laser spot size of about 1 millimetre diameter.

FIG. 5 is a graph of depth of removed material versus length of laser pulse, FIG. 6 is a graph of depth of material removed versus energy of the laser pulse and FIG. 7 is a graph showing the depth of molten material versus the traversing speed of the laser beam. From these relationships it can be seen that a minimum power energy and interaction time are required to initiate the molten liquid ejection. Too high an interaction time would be less efficient since some energy would be lost by conduction and heating of vaporised material. There is an optimum energy and interaction time which have quadrant relationships with the removal depth, the removal depth being largely controlled by pulse width and energy density. Traversing speed of the laser beam has very little effect on the depth of material removal. However, when the traversing speed is too low, low height sputtering takes place due to repeated heating of the same spot through reduced laser power density (beam defocus) at a certain depth which can generate volcano-like craters and debris. Too high a traversing speed tends to produce discontinuous removal of material. An optimum traversing speed has been found to be approximately equal to the laser spot size multiplied by the laser pulse frequency. Therefore, a high laser beam repetition rate would enable a high processing speed.

Compared to other laser decontamination methods, laser generated liquid ejection is more economic in terms of gas saving. The use of a compressed air/water mist (at an air flow rate of less than 500 litres per minute and a water flow rate of 0.2 litres per minute) enables the cooling and collection of the ejected material to be achieved in a single process.

What is claimed is:

1. A method for the removal of embedded contamination from a metallic surface, the method comprising directing a laser beam on to the surface, the laser beam having sufficient power density to melt at least a portion of said surface and to cause direct ejection of laser-generated melt pool liquid from the metallic surface by laser-generated vapor pressure in the melt pool liquid, thereby removing a portion of said metallic surface layer containing the embedded contamination, said laser beam having a pulse duration of at least 1 millisecond.

2. A method as in claim 1 and wherein the direct ejection of the laser-generated melt pool liquid is achieved without the use of an additional gas jet blown into the melt pool.

3. A method as in claim 1 and wherein a laser-generated recoil pressure is between 5 to 100 bar.

4. A method as in claim 1 and wherein the laser beam power density is greater than 6 $MW/cm^2$.

5. A method as in claim 1 and wherein the laser producing the laser beam is a gas or a solid state laser.

6. A method as in claim 1 and wherein the metallic surface comprises stainless steel or mild steel.

7. A method as in claim 1 and wherein means are provided for the collection of laser ejected material in order to prevent recontamination of the metallic surface or contamination of previously uncontaminated surfaces.

8. A method as in claim 7 and wherein the means provided for the collection of laser ejected material comprise an air/water spray and an extraction system.

9. A method for the removal of embedded contamination from a metallic surface, the method comprising directing a laser beam on to the surface, the laser beam having sufficient power density to cause direct ejection of laser-generated melt pool liquid from the metallic surface thereby removing a portion of said metallic surface layer containing the embedded contamination, wherein the direct ejection of the laser-generated melt pool liquid is achieved without the use of an additional gas jet blown into the melt pool.

10. A method for the removal of embedded contamination from a metallic surface, the method comprising directing a laser beam on to the surface, the laser beam having sufficient power density to melt at least a portion of said surface and to cause direct ejection of laser-generated melt pool liquid from the metallic surface by laser-generated vapor pressure in the melt pool liquid, thereby removing a portion of said metallic surface layer containing the embedded contamination.

* * * * *